Figure 1:
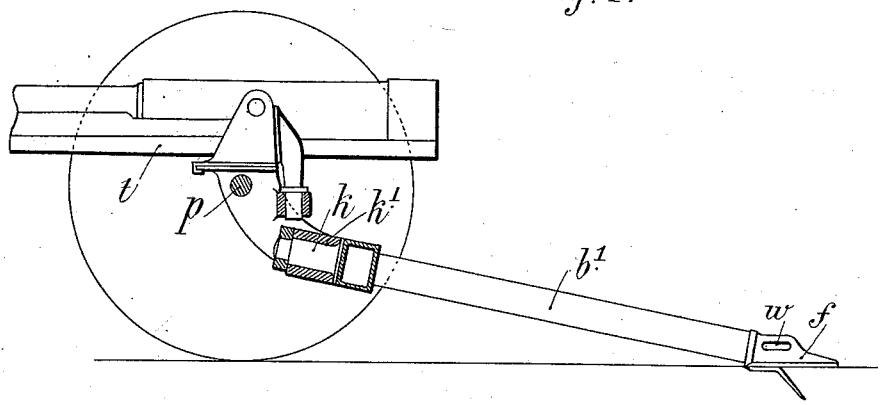

E. SCHNEIDER.
GUN CARRIAGE.
APPLICATION FILED FEB. 14, 1913.

1,085,169.

Patented Jan. 27, 1914.

5 SHEETS—SHEET 1.

E. SCHNEIDER.
GUN CARRIAGE.
APPLICATION FILED FEB. 14, 1913.

1,085,169.

Patented Jan. 27, 1914.
5 SHEETS—SHEET 2.

E. SCHNEIDER.
GUN CARRIAGE.
APPLICATION FILED FEB. 14, 1913.

1,085,169.

Patented Jan. 27, 1914.

5 SHEETS—SHEET 3.

Witnesses:
Ruth C. Fitzhugh.
E. E. Warfield

Inventor
Eugene Schneider
by
Mauro, Cameron, Lewis & Massie
Attys.

COLUMBIA PLANOGRAPH CO., WASHINGTON, D. C.

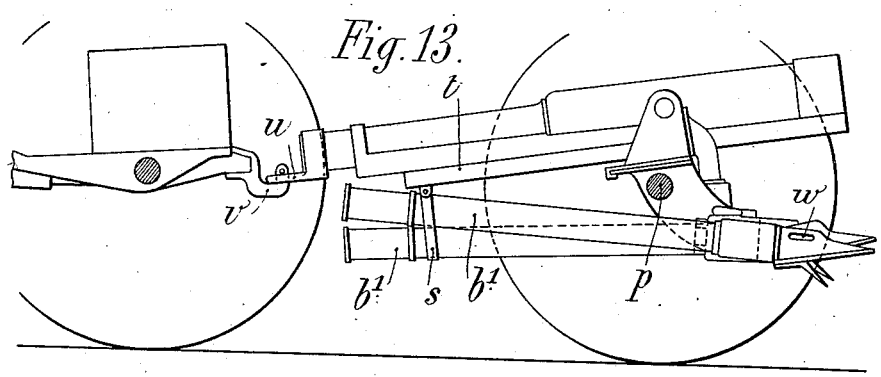
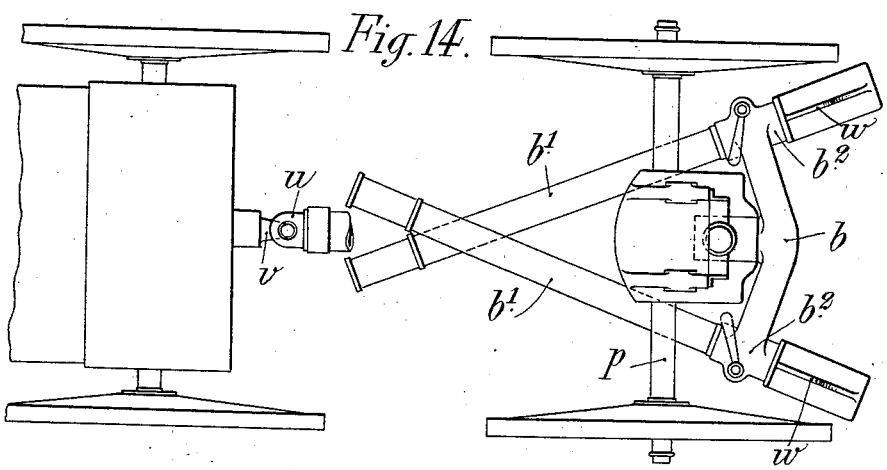

E. SCHNEIDER.
GUN CARRIAGE.
APPLICATION FILED FEB. 14, 1913.

1,085,169.

Patented Jan. 27, 1914.
5 SHEETS—SHEET 5.

UNITED STATES PATENT OFFICE.

EUGÈNE SCHNEIDER, OF LE CREUZOT, FRANCE.

GUN-CARRIAGE.

1,085,169.      Specification of Letters Patent.      Patented Jan. 27, 1914.

Application filed February 14, 1913. Serial No. 748,413.

*To all whom it may concern:*

Be it known that I, EUGÈNE SCHNEIDER, a citizen of the Republic of France, and resident of Le Creuzot, Saône-et-Loire, France, have invented a new and useful Improvement in Gun-Carriages, which is fully set forth in the following specification.

This invention relates generally to gun carriages, and more particularly to an improvement over my co-pending applications Serial Numbers 748,410, 748,411, and 748,412. In said applications, a gun carriage has been described which comprises a substantially U-shaped frame pivoted to the gun carriage, trail, or axle by means of a pivotal joint, this arrangement rendering it possible for the carriage as a whole to automatically adjust itself to the ground by reason of the complete transverse independence existing between the spades and the carriage.

According to the present invention, the U-shaped frame, pivoted to the gun carriage or axle, is so constructed that it is capable of forming a rigid frame in the anchored or firing position, and may be rapidly converted into a rigid triangle, so that it can be attached to the muzzle, limber, or other suitable device. This object is attained by sliding the shafts or branches of the frame in the base thereof along their longitudinal axes, until the front extremity or the rear extremity of said shafts or branches alternately engage said base. In this manner a ready conversion of the frame is effected for the purpose of limbering without the employment of joints or breaks in the branches or shafts, which would be liable to create weak spots, and furthermore, a convenient limbering device is obtained which considerably reduces the bulk of the gun carriage during transportation. Finally, the unlimbered gun carriage can be made ready for firing with great rapidity.

The inventive idea involved is capable of receiving a variety of mechanical expressions, several of which, for the purpose of illustration, are shown in the accompanying drawings; but it is to be expressly understood that said drawings and the particular construction shown therein and described in the specification are employed simply for the purpose of facilitating the description of the invention as a whole, and not for the purpose of defining the limits of the invention, reference being had to the claims for this purpose.

Figure 2:
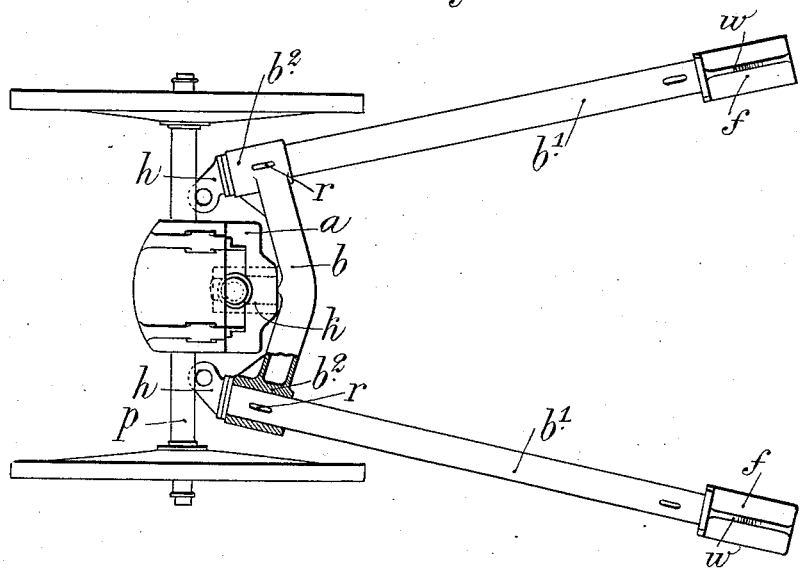
Figure 3:
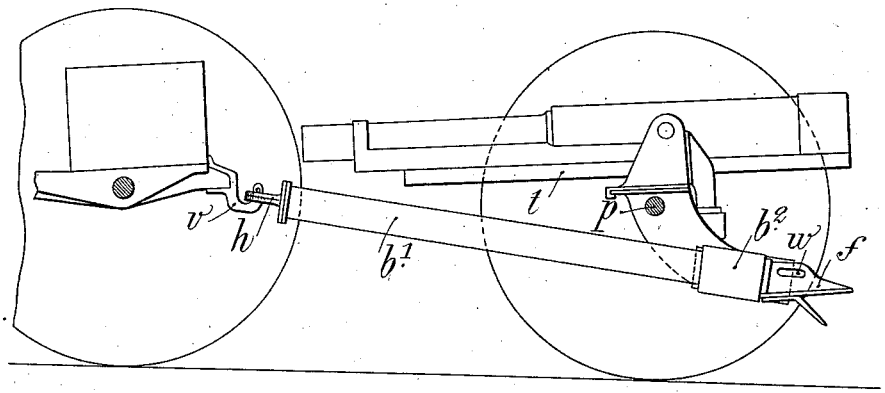
Figure 4:
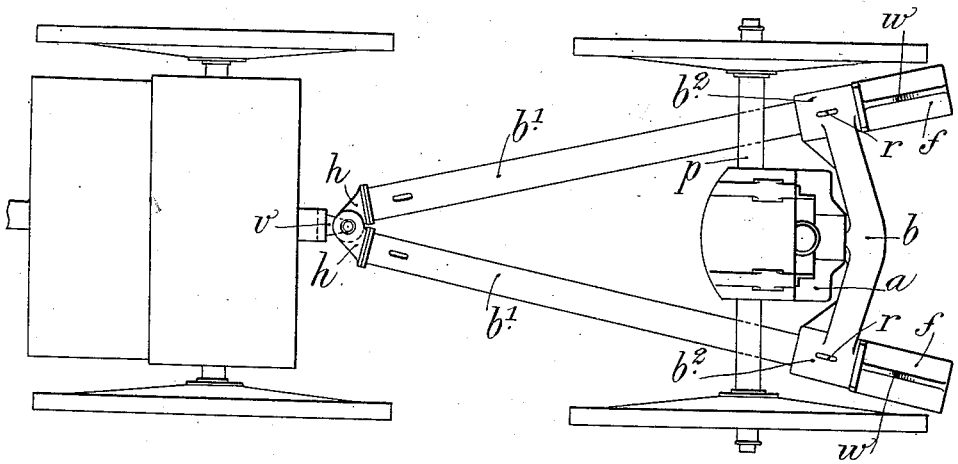
Figure 5:
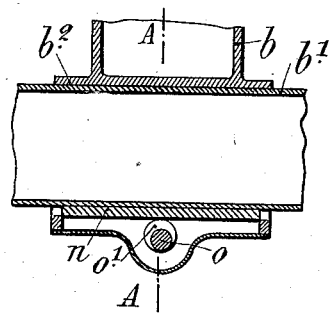
Figure 6:
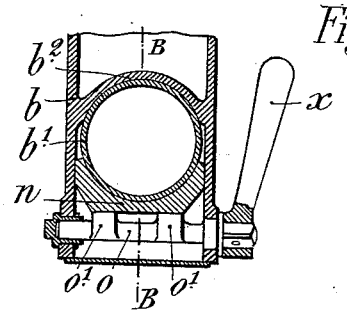
Figure 7:
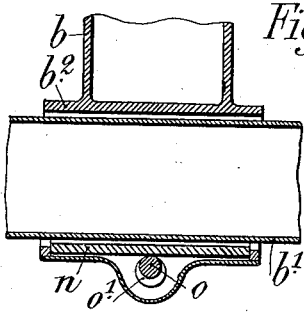
Figure 8:
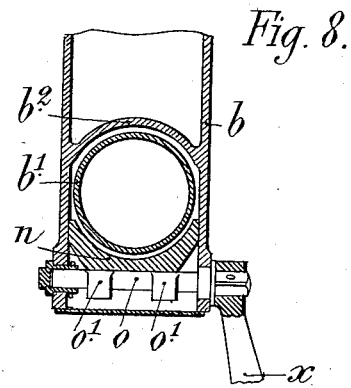
Figure 9:
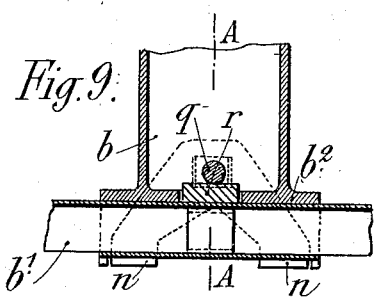
Figure 10:
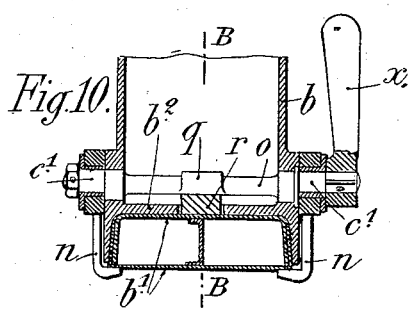
Figure 11:
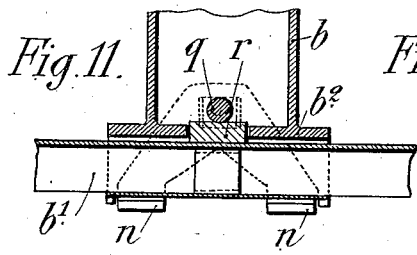
Figure 12:
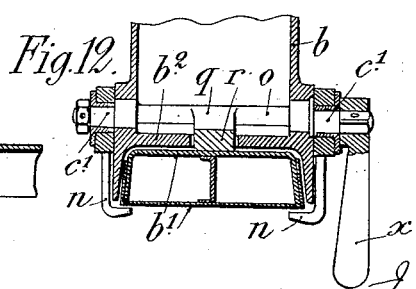
Figure 15:
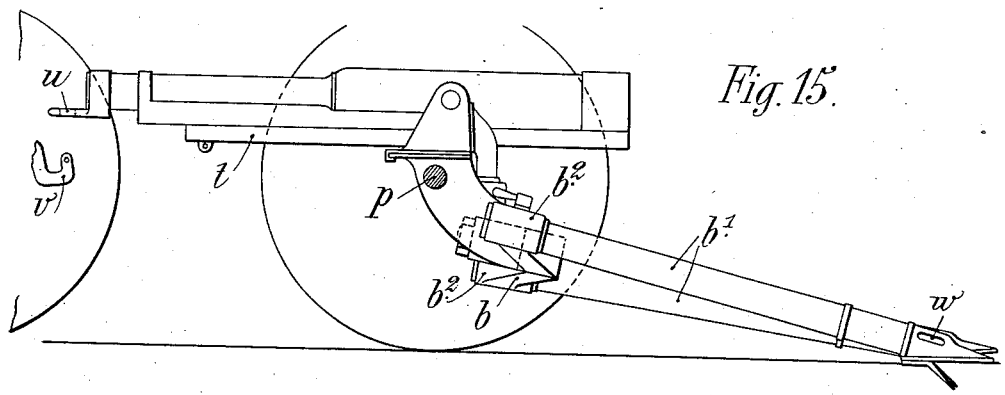
Figure 16:
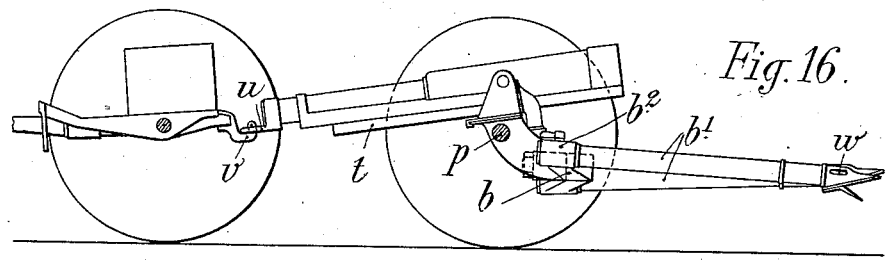

In the drawings:—Figure 1 is a side elevation of one form of the invention, showing the gun carriage in firing position; Fig. 2 is a top plan view thereof; Fig. 3 is a side elevation showing the gun carriage coupled to the limber; Fig. 4 is a top plan view thereof; Fig. 5 is a longitudinal section on the line B—B of Fig. 6, showing a means for locking the shafts of the trail; Fig. 6 is a section on the line A—A of Fig. 5, showing the means in locked position; Figs. 7 and 8 are views corresponding respectively to Figs. 5 and 6, showing the means in unlocked position; Figs. 9 and 10 are views corresponding respectively to Figs. 5 and 6, showing another form of the locking means in locked position; Figs. 11 and 12 are views similar to Figs. 9 and 10, showing the means in unlocked position; Fig. 13 is a side elevation of a slightly modified form of the invention, the trail shafts being supported from the non-recoiling portion of the gun carriage, the muzzle of the gun being connected directly to the limber; Fig. 14 is a top plan view thereof; Fig. 15 is a side elevation showing the form illustrated in Fig. 13 in unlimbered or firing position; and Fig. 16 illustrates the position occupied during travel just before stopping for unlimbering the gun carriage.

Referring more particularly to Figs. 1 to 4, each of the shafts $b'$, for passing from the limbering position to the firing position and vice versa, slides in a sleeve $b^2$ formed at the adjacent extremity of the base $b$ of the frame. The front extremity of each shaft $b'$ of the frame is provided with an eye $h$. Two eyes $h$ are arranged in such manner that they are superposed for coupling up to the limber at the front end of the gun carriage, as shown in Figs. 3 and 4. The spades $f$ strike against the sleeves $b^2$ and are fixed thereto by locking in some convenient manner.

The conversion of the rigid frame from firing position into a rigid triangle for limbering can, of course, be effected by means other than the sliding of the shafts $b'$ in the sleeves $b^2$ at the extremities of the base $b$; for example, a simple arrangement of hooks might be adopted. In all cases, rigidity in the traveling and firing positions will be insured, either as shown in Figs. 1 to 4 by means of keys $r$, or by any other method of locking or wedging.

Referring now to Figs. 5 to 8, another means for locking the shafts is shown. In this form of the device, the shafts $b'$ are shown in the form of tubes. Semi-circular bearings $b^2$ are formed at the extremities of the base $b$ in which the shafts $b'$ are free to slide. The clamping of the tubes $b'$ upon these bearings is effected by means of a semi-circular jaw $n$. A shaft $o$ is journaled in the walls of the bearing $b^2$ and is provided with the small cams or noses $o'$ which force the jaw $n$ into gripping engagement with the shaft $b'$ when the handle $x$ of the shaft $o$ is operated.

Referring now to Figs. 9 to 12, there is shown a further means for locking the shafts in position, the latter, in this case, being in the form of plates of channeled cross section which may, if desired, be reinforced in places in such a manner that the branches are of trapezoidal cross section. Each of the shafts $b'$ slides in a corresponding bearing $b^2$ formed at the extremity of the base $b$ of the frame.

By rotating the handle $x$ from the position shown in Fig. 12 to that shown in Fig. 10, the claws $n$, which are mounted upon the crank portions $c'$ of the shafts $o$, are raised into gripping engagement with the shafts $b'$ and lock the same against movement in the bearings $b^2$. When it is desired to unlock the shafts $b'$, the handle $x$ is moved back to the position shown in Fig. 12 and the cam $q$ carried by the shaft $o$ acts upon a block $r$ to force the shaft $b'$ away from the bearing $b^2$. By the several means shown and described, the detachment of the shafts $b'$ and frame is facilitated.

The limbering of the gun carriage, instead of taking place as in the example shown in Figs. 1 to 4, that is to say, by engagement of the limber with the united extremities of the shafts $b'$, might be effected as shown in the modification illustrated in Figs. 13 to 16. In this example, the limbering is effected by the engagement of the limber with the muzzle of the gun itself. This construction has the advantage that the conversion of the frame for bringing it from traveling position into firing position can be effected while still traveling and before actually unlimbered. The shafts $b'$ united or crossed toward the front (and guided in the latter case in sleeve $b^2$ of different inclinations), are supported by means of some convenient form of engaging device, such as a bracket $s$ depending from the non-recoiling portion $t$ of the gun (Fig. 13). The muzzle of the gun carries a limbering eye $u$ for engagement with a hook $v$ of the limber.

While the carriage is traveling and before it reaches firing position, the gunners unhook the extremities of the shafts $b'$ of the frame, and while continuing on the road, they pull the said shafts rearwardly by means of trail handles $w$ to bring them into the position shown in Fig. 16. The gunners can then leave the carriage, the center of gravity of the gun as a whole tending to cause it to rock rearwardly into the position shown in Fig. 15, it being only necessary to disconnect the parts $u$ and $v$. This can be effected automatically if desired, at the proper moment, by the action of gravity so that the carriage, occupying the position shown in Fig. 16, will move to the position illustrated in Fig. 15.

It is possible in all of the constructional forms herein described to slightly bend outward the shafts $b'$ of the frame in order to increase the distance between the spades on the rear ends of the shafts.

What is claimed is:—

1. In combination, a limber, a gun carriage supporting a gun pointed in the direction of said limber, and trail shafts adjustably connected to the gun carriage and adapted to be drawn under the gun when the carriage is in traveling position.

2. In combination, a limber, a gun carriage supporting a gun pointed in the direction of said limber, trail shafts adjustably connected to the gun carriage and adapted to be drawn under the gun when the carriage is in traveling position, and means for locking said shafts in position.

3. In a gun carriage, the combination of a trail base, two trail shafts slidably mounted in said base and adapted to be drawn under the gun, and means for connecting the forward ends of said shafts when the carriage is in traveling position.

4. In a gun carriage, the combination of a trail base, two trail shafts slidably mounted in said base and adapted to be drawn under the gun, means for connecting the forward ends of said shafts when the carriage is in traveling position, and means for locking said shafts to said base.

5. In a gun carriage, the combination of a trail base, converging trail shafts slidably mounted in said base, and means for connecting the forward ends of said shafts when the carriage is in traveling position.

6. In a gun carriage, the combination of a trail base, converging trail shafts slidably mounted in said base, means for connecting the forward ends of said shafts when the carriage is in traveling position, and means for locking said shafts to said base.

7. In a gun carriage, the combination of a trail base having a pivotal connection with said carriage on an axis lying in the direction of travel of the carriage, bearings carried by said base and arranged at an angle to said pivotal connection, and trail shafts slidably mounted in said bearings.

8. In a gun carriage, the combination of a trail base having a pivotal connection with said carriage on an axis lying in the direction of travel of the carriage, bearings carried by said base and arranged at an angle to said pivotal connection, trail shafts slidably mounted in said bearings, and means for locking said shafts in said bearings.

9. In a gun carriage, the combination of a trail base having a pivotal connection with said carriage on an axis lying in the direction of travel of the carriage, bearings carried by said base and arranged at an angle to said pivotal connection, trail shafts slidably mounted in said bearings, and means for connecting the forward ends of said shafts when the carriage is in traveling position.

10. In a gun carriage, the combination of a trail base having a pivotal connection with said carriage on an axis lying in the direction of travel of the carriage, bearings carried by said base and arranged at an angle to said pivotal connection, trail shafts slidably mounted in said bearings, means for connecting the forward ends of said shafts when the carriage is in traveling position, and means for locking said shafts in said bearings.

In testimony whereof I have signed this specification in the presence of two subscribing witnesses.

EUGÈNE SCHNEIDER.

Witnesses:
HANSON C. COXE,
ROBERT DE TERELINGER.

Copies of this patent may be obtained for five cents each, by addressing the "Commissioner of Patents, Washington, D. C."